(12) United States Patent
Liu

(10) Patent No.: US 12,175,153 B2
(45) Date of Patent: Dec. 24, 2024

(54) VEHICLE INFOTAINMENT SYSTEM

(71) Applicant: HUAWEI TECHNOLOGIES CO., LTD., Shenzhen (CN)

(72) Inventor: Ming Liu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/452,384

(22) Filed: Aug. 18, 2023

(65) Prior Publication Data

US 2023/0401025 A1 Dec. 14, 2023

Related U.S. Application Data

(63) Continuation of application No. PCT/EP2021/054092, filed on Feb. 19, 2021.

(51) Int. Cl.
| | |
|---|---|
| *G06F 3/14* | (2006.01) |
| *B60K 35/00* | (2006.01) |
| *B60K 35/10* | (2024.01) |
| *B60K 35/22* | (2024.01) |
| *B60K 35/28* | (2024.01) |
| *B60K 35/53* | (2024.01) |

(52) U.S. Cl.
CPC ............ *G06F 3/1446* (2013.01); *B60K 35/00* (2013.01); *B60K 35/10* (2024.01); *B60K 35/22* (2024.01);
(Continued)

(58) Field of Classification Search
CPC ....... G06F 3/1446; B60K 35/00; B60K 35/10; B60K 35/22; B60K 35/28; B60K 35/53;
(Continued)

(56) References Cited

U.S. PATENT DOCUMENTS

| | | | |
|---|---|---|---|
| 2005/0140191 A1* | 6/2005 | Curran .................. | B60K 35/10 297/217.3 |
| 2009/0316057 A1* | 12/2009 | Campbell .............. | B60K 35/00 348/836 |

(Continued)

FOREIGN PATENT DOCUMENTS

| | | |
|---|---|---|
| CN | 103517822 A | 1/2014 |
| CN | 107351763 A | 11/2017 |

(Continued)

OTHER PUBLICATIONS

Torres et al., "A Machine-Learning Approach to Distinguish Passengers and Drivers Reading While Driving," Sensors, 19(14): 3174, doi: 10.3390/s19143174, PMID: 31330929, PMCID: PMC6679284, https://www.ncbi.nlm.nih.gov/pmc/articles/PMC6679284/, pp. 1-29, MDPI, Basel, Switzerland (Jul. 19, 2019).

*Primary Examiner* — Christopher E Leiby

(74) *Attorney, Agent, or Firm* — Leydig, Voit & Mayer, Ltd.

(57) ABSTRACT

A vehicle infotainment system is provided. The vehicle infotainment system includes a repositionable display, a sensing arrangement, and a controller. The repositionable display is attached to a vehicle and slidable along a defined path between a first position and a second position within the vehicle. The sensing arrangement detects a position of the repositionable display. The controller is operatively connected to the repositionable display and to the sensing arrangement. The controller controls provision of content to the repositionable display, and is configured to control the content provided to the repositionable display in dependence on signals received from the sensing arrangement.

26 Claims, 12 Drawing Sheets

(52) U.S. Cl.
CPC .............. *B60K 35/28* (2024.01); *B60K 35/53* (2024.01); *B60K 2360/143* (2024.01); *B60K 2360/164* (2024.01)

(58) Field of Classification Search
CPC .. B60K 35/20; B60K 35/29; B60K 2360/143; B60K 2360/164; B60K 2360/182; B60K 2360/197; B60K 2360/1438; B60K 2360/151; B60K 2360/1523; B60K 2360/195
See application file for complete search history.

(56) References Cited

U.S. PATENT DOCUMENTS

| | | | |
|---|---|---|---|
| 2014/0263511 A1* | 9/2014 | Clements | B60R 7/06 224/483 |
| 2016/0196800 A1 | 7/2016 | Kim et al. | |
| 2017/0322760 A1* | 11/2017 | Soh | G06F 3/1431 |
| 2019/0004764 A1* | 1/2019 | Son | G06F 1/1616 |
| 2019/0077357 A1* | 3/2019 | Rupp | B60R 21/21 |
| 2019/0361656 A1* | 11/2019 | Ellis | G06F 3/0488 |
| 2020/0227000 A1* | 7/2020 | Liu | G06V 40/16 |
| 2020/0346546 A1* | 11/2020 | Oh | B60K 35/20 |
| 2021/0291660 A1* | 9/2021 | Szczerba | B60K 35/65 |
| 2022/0144041 A1* | 5/2022 | Huang | B60H 1/242 |

FOREIGN PATENT DOCUMENTS

| | | | |
|---|---|---|---|
| FR | 3050562 A1 | 10/2017 | |
| WO | 2020187129 A1 | 9/2020 | |

* cited by examiner

VEHICLE INFOTAINMENT SYSTEM

CROSS-REFERENCE TO RELATED APPLICATIONS

This application is a continuation of International Application No. PCT/EP2021/054092, filed on Feb. 19, 2021, the disclosure of which is hereby incorporated by reference in its entirety.

TECHNICAL FIELD

Embodiments of the present disclosure generally relate to a vehicle infotainment system, and more particularly, to an infotainment system having a repositionable display and a method of controlling an infotainment system of a vehicle.

BACKGROUND

An in-vehicle infotainment (IVI) system may be described as a combination of vehicle systems which are used to deliver entertainment and information to a driver and passengers through audio/video interfaces, control elements such as touch screen displays, a button panel, voice commands, and more. Modern vehicles normally feature one or more display devices possibly with a touch screen function for convenient human-machine interaction. The display device(s) may be placed in an instrument cluster (IC) system, a dashboard display, as well as possibly a rear-seat entertainment (RSE) system. In a vehicle dashboard, the displays for the instrument cluster and an IVI middle console are fixed in their positions. The IC display is dedicated to the driver and shows vehicle or driving-related information such as vehicle speed, engine speed, vehicle status symbols, and possibly advanced contents such as navigation information with digital liquid crystal display (LCD) or light emitting diode (LED) panel support.

The IVI display is typically mounted either in a central console, or may instead be mounted generally centrally in a dashboard of the vehicle. The IVI display is used by the driver and a front seat passenger (co-driver) for more complex information, such as map-based navigation system data, images from parking or other vehicle-mounted cameras, and possibly entertainment in the form of TV, other video, or computer games, or for the display of content "mirrored" from a mobile phone or the like. The IVI display may be slightly movable, e.g. rotatable from portrait to landscape, or flippable to pop up or hide the display, but its absolute position is still largely fixed in a position intermediate the driver and a front passenger seat, and typically in a position mid-way between the two lateral extremes of the driver seating area (driver cabin). The above IVI display has some drawbacks with this configuration. For example, as the IVI display is located in between the driver and the co-driver (e.g. in a central console), both the driver and the co-driver have to rotate their heads to a certain angle, away from a straight ahead position, to look at the IVI display/screen. Also, the position of the IVI display means that it can be difficult or uncomfortable for the co-driver to enter commands on the IVI display panel and to view the display for extended periods.

Recently, some high-end (luxury) vehicles have included an additional, dedicated display that is better positioned with respect to the front seat passenger, so that the front seat passenger is better able to input control commands via the display, and is also given a more comfortable viewing position with respect to the dedicated screen. Some such luxury vehicles thus have a row of three displays, one for IC, one for the middle console and one for the co-driver. It seems likely that, with the usual trickle down of features from high-end vehicles to lower cost models, such multi-display configurations will increasingly be adopted in more and more vehicles. However, adoption of so many digital displays imposes a high-cost pressure on vehicle manufacturers.

In the rear seat of some vehicles, dual fixed screens are fixed on the rear seat entertainment (RSE) system with one for each of passengers sitting either on the left or on the right of the vehicle. However, these dual fixed screens do not provide a good view for other rear seat passengers (e.g. for one or more passengers seated between the outermost rear seat passengers). Some vehicles thus provide a single big screen located in the centre (i.e. centred from the left to the right of the vehicle). However, the single big screen may not provide an optimum view for passengers on the left or right, and also does not allow two rear seat passengers to have their own dedicated content.

In vehicle infotainment systems it is known to focus on monitoring and detecting the vehicle status, for example whether the vehicle is parked (with the gearbox in neutral or "park", and for example with the parking brake engaged), or travelling at a low speed of say less than 10 m.p.h. or 20 kmph, to avoid distraction of the driver and consequent traffic accidents. For example, it is known to suppress a TV function from a front display in the event that the vehicle is determined to be in gear, to be in motion, or with the parking brake engaged. Thus a vehicle driver may be able to watch TV content on a front display when the vehicle is parked, but cannot continue to watch the TV content while driving. However, such solutions also prevent the front seat passenger from watching TV content, or the like, while the vehicle is on the move.

Therefore, there arises a need to address the aforementioned technical problem/drawbacks in known systems in providing driver safety and in-vehicle user-experience for the co-driver or backseat passengers.

SUMMARY

It is an object of the disclosure to provide a vehicle infotainment system and an improved method of controlling an infotainment system of a vehicle while avoiding one or more disadvantages of prior art approaches.

This object is achieved by the features of the independent claims. Further, implementation forms are apparent from the dependent claims, the description, and the figures.

The disclosure provides a vehicle infotainment system and a method of controlling an infotainment system of a vehicle.

According to a first aspect, there is provided a vehicle infotainment system comprising:
  a repositionable display attached to a vehicle and slidable along a defined path between a first position and a second position within the vehicle;
  a sensing arrangement to detect a position of the repositionable display; and
  a controller to control provision of content to the repositionable display, the controller being operatively connected to the repositionable display and to the sensing arrangement;
  the controller being configured to control the content provided to the repositionable display in dependence on signals received from the sensing arrangement.

The vehicle infotainment system improves a user experience of a passenger of a front-passenger seat by translating the repositionable display right in front of the passenger of the front-passenger seat. The vehicle infotainment system prohibits the display of distractive content and distracting display input operations to the driver, thereby reducing the risk of distraction based accidents while driving. However, the vehicle infotainment system makes the distractive content and display input operations available to the passenger of the front-passenger seat. The vehicle infotainment system enhances a display effect and in-vehicle user-experience for the passenger of the front-passenger seat and/or passengers positioned in passenger seats to the rear of a driver's seat of the vehicle. The vehicle infotainment system does not require an additional display for the passenger of the front-passenger seat, thereby reducing cost of the vehicle infotainment system. The vehicle infotainment system provides more complex content or operations to the passenger of the front-passenger seat (e.g. gaming or videos), but not for the driver.

The first position may be in front of a front-passenger seat of the vehicle, and the second position may be a centre console position intermediate a driver's seat and the front-passenger seat. Optionally, the second position coincides with a centre line of the vehicle, and the first position is in front of a front-passenger seat of the vehicle. The first position may be adjacent to a passenger airbag for a passenger of the front-passenger seat.

Optionally, the repositionable display is recessed into a dashboard of the vehicle.

The repositionable display may be mounted to a track which defines the defined path and along which it can be translated between the first position and the second position.

Optionally, the controller is configured, in dependence on signals received from the sensing arrangement, to:
supply content selected from a first set of content to the repositionable display when the repositionable display is in the first position; and
supply content selected from a second set of content to the repositionable display when the repositionable display is in the second position, the second set of content being a subset of the first set of content.

Optionally, the controller is configured also to supply content selected from the second set of content to the repositionable display when the repositionable display is between the first position and the second position.

The controller may be configured to restrict the display of content on the repositionable display when the repositionable display is at neither the first position nor the second position.

The controller may be configured to:
supply at least some driving-related information to the repositionable display while the repositionable display is in the second position; and
supply the driving-related information to a head up display or an instrument cluster display when the repositionable display is in the first position.

Optionally, the repositionable display is touch sensitive for the receipt of user control inputs, and the controller is configured to:
process a first set of touch inputs while the repositionable display is in the first position; and
process only a second set of touch inputs while the repositionable display is in the second position, the second set of touch inputs being a subset of the first set of touch inputs. The controller may be restricted to process only the first set of touch inputs only while the vehicle is in motion.

Optionally, a motor drive arrangement is provided to translate the repositionable display between the first position and the second position and back.

The repositionable display may be one of a pair of displays for the use of passengers positioned in passenger seats to the rear of a driver's seat of the vehicle, and in the first position the pair of displays are separated, while in the second position the pair of displays are adjacent. Optionally, each of the displays is mounted in a housing, the housings having complementary formations that are engageable to couple the housings together when the displays are in the second position. Alternatively, each of the displays may be mounted in a housing, the housings having complementary magnets to couple the housings together when the displays are in the second position.

Optionally, when the repositionable display is in the second position, the controller may be configured to adapt a display mode of the content provided to the pair of displays. When the repositionable display is in the second position the controller may be configured to treat the pair of displays as a single display. The vehicle infotainment system may thus provide a combined display to passengers positioned in the passenger seats to the rear of a driver's seat of the vehicle by combining the pair of displays.

Optionally, each display of the pair of displays is mounted to a respective seat ahead of the rear passenger seats. Each display of the pair of displays may be mounted to the respective seat by means of a track along which the respective display can be translated between the first position and second position. Optionally, each display of the pair of displays is coupled to a mount that is supported from above. Optionally, each display of the pair of displays may be coupled to a mount that is supported from below. Optionally, each display of the pair of displays is rotatable about a respective axis between portrait and landscape orientations. In the second position, each of the pair of displays may be in the portrait orientation.

Optionally, the sensing arrangement includes a combination of at least one magnet and at least one Hall effect sensor.

According to a second aspect, there is provided a method of controlling an infotainment system of a vehicle, the system including:
a repositionable display attached to a vehicle and slidable along a defined path between a first position and a second position within the vehicle;
a sensing arrangement to detect the position of the repositionable display; and
a controller operatively connected to the repositionable display and to the sensing arrangement, the controller being configured to connect to one or more content sources and to control provision to the display of content from the one or more content sources; the method comprising:
using the controller to supply content from the one or more content sources to the repositionable display, the content supplied to the repositionable display being determined in part in dependence on signals received from the sensing arrangement.

Optionally, the method further comprises using the controller to:
supply content selected from a first set of content to the repositionable display when the repositionable display is in the first position; and supply content selected from a second set of content to the repositionable display when the repositionable display is in the second position, the second set of content being a subset of the first set of content.

Optionally, the method further comprises using the controller to restrict the display of content on the repositionable display when the repositionable display is at neither the first position nor the second position.

Optionally, the method further comprises using the controller to supply content selected from the second set of content to the repositionable display when the repositionable display is between the first position and the second position.

A technical problem in the prior art is resolved, where the technical problem is that controlling an infotainment system to enhance driver safety and the user experience of the front-passenger and the passengers.

Therefore, in contradistinction to the prior art, according to the vehicle infotainment system and the method of controlling an infotainment system of a vehicle of aspects of the disclosure, the user experience of the passenger of the front-passenger seat may be improved by translating the repositionable display right in front of the passenger of the front-passenger seat. The vehicle infotainment system enhances a display effect and an entertainment experience to the passenger in front-passenger seats or to passengers in passenger seats to the rear of a driver's seat of the vehicle (rear passenger seats).

These and other aspects of the disclosure will be apparent from the implementation(s) described below.

BRIEF DESCRIPTION OF DRAWINGS

Implementations of the disclosure will now be described, by way of example only, with reference to the accompanying drawings, in which.

DETAILED DESCRIPTION OF THE DRAWINGS

Implementations of the disclosure provide a vehicle infotainment system and a method of controlling an infotainment system of a vehicle. The vehicle infotainment system improves a user experience of a passenger of a front-passenger seat by shifting a repositionable display right in front of a passenger of a front-passenger seat.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and the accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
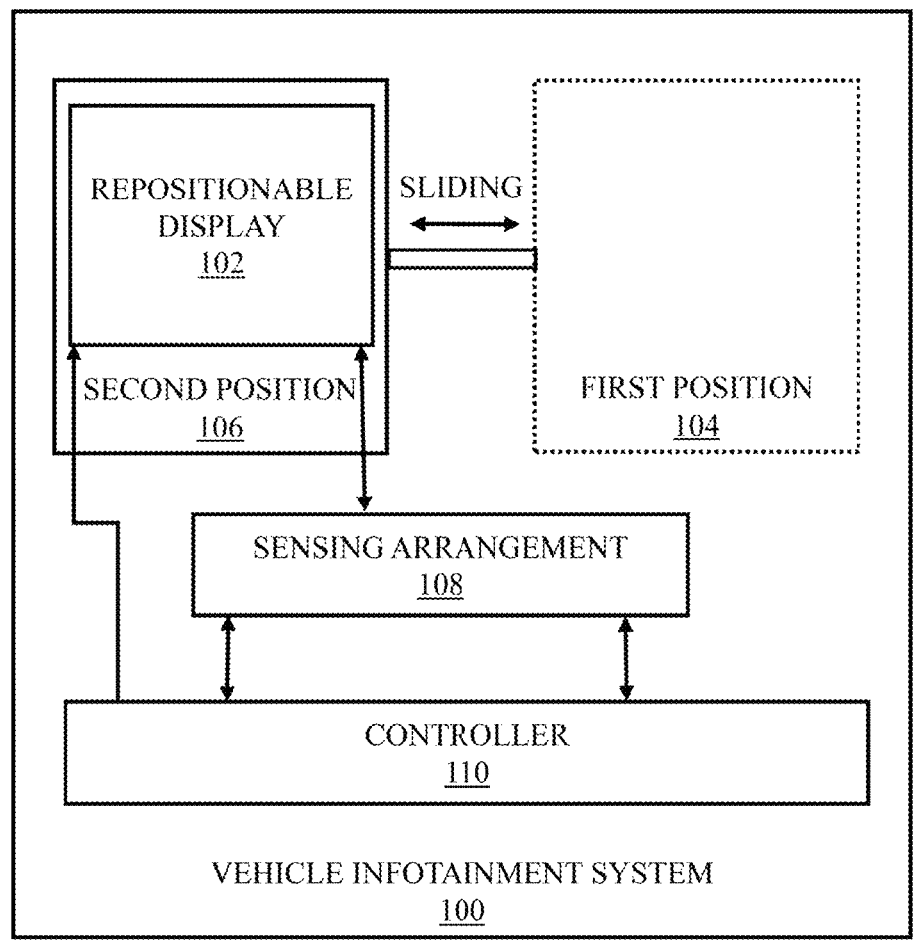
FIG. 1 is a block diagram of a vehicle infotainment system in accordance with an implementation of the disclosure.

FIG. 1 is a block diagram of a vehicle infotainment system 100 in accordance with an implementation of the disclosure. The vehicle infotainment system 100 includes a repositionable display 102, a sensing arrangement 108, and a controller 110. The repositionable display 102 is attached to a vehicle and slidable along a defined path between a first position 104 and a second position 106 within the vehicle. The sensing arrangement 108 detects a position of the repositionable display 102. The controller 110 controls provision of content to the repositionable display 102, the controller 110 being operatively connected to the repositionable display 102 and to the sensing arrangement 108. The controller 110 is configured to control the content provided to the repositionable display 102 in dependence on signals received from the sensing arrangement 108.

The vehicle infotainment system 100 improves a user experience of a passenger of a front-passenger seat by enabling the repositionable display 102 to be repositioned right in front of the passenger of the front-passenger seat. The vehicle infotainment system 100 prevents the display of distracting content to the driver and limits driver input operations, thereby reducing the incidence of distraction induced accidents while driving. However, the vehicle infotainment system 100 makes such distracting content and input operations available to the passenger of the front-passenger seat. The vehicle infotainment system 100 enhances a display effect and in-vehicle user-experience for the passenger of the front-passenger seat or passengers positioned in passenger seats to the rear of a driver's seat of the vehicle (i.e. rear passenger seats). The vehicle infotainment system 100 does not require an additional display for the passenger of the front-passenger seat, thereby reducing the cost of the vehicle infotainment system 100. The vehicle infotainment system 100 provides more complex content or operations to the passenger of the front-passenger seat (e.g. gaming or videos), but not for the driver. Therefore, the repositionable display 102 and the operations on the repositionable display 102 reduce driver-distraction risks due to their exclusive use by the passenger of the front-passenger seat.

The repositionable display 102 is a display that can be moved/slid from the first position 104 to the second position 106 and back again. The first position 104 may be in front of the front-passenger seat of the vehicle, and the second position 106 may be a centre console position intermediate a driver's seat and the front-passenger seat. The repositionable display 102 may be mounted to a track which defines the defined path and along which the repositionable display can be translated between the first position 104 and the second position 106. Optionally, the vehicle infotainment system 100 is connected to a motor drive arrangement that translates the repositionable display 102 between the first position 104 and the second position 106 and back.

Optionally, the controller 110 is configured, in dependence on signals received from the sensing arrangement 108, to: supply content selected from a first set of content to the repositionable display 102 when the repositionable display 102 is in the first position 104; and to supply content selected from a second set of content to the repositionable display 102 when the repositionable display 102 is in the second position 106, the second set of content being a subset of the first set of content. The first set of content optionally includes content related to music, games, videos, etc. and the second set of content optionally includes vehicle and driving-related information includes vehicle status, navigation information, etc. Alternatively, the first set and second sets of content can be completely different from each other, with no overlapping content.

The controller 110 may be configured to restrict the display of content on the repositionable display 102 when the repositionable display 102 is at neither the first position 104 nor the second position 106. For example, the controller may be configured to blank out the display when the repositionable display 102 is at neither the first position 104 nor the second position 106. Or, alternatively, the controller may be configured to cause a notification to appear on the repositionable display 102 in lieu of other content, the notification containing a message to the effect that content will only be displayed on the repositionable display when the repositionable display is in either of the first or second positions, i.e. of the need to move the repositionable display from its current position.

Optionally, the controller 110 is configured also to supply content selected from the second set of content to the repositionable display 102 when the repositionable display 102 is between the first position 104 and the second position 106. That is, the controller may be so configured that content that is safe for the driver to observe may continue to be displayed on the repositionable display even when the repositionable display is between the first and second positions.

Optionally, the repositionable display 102 is used by the driver and the passenger of the front-passenger seat at the second position 106 (e.g. the centre console) and is exclusively used by the passenger of the front-passenger seat at the first position 104 (e.g. right in front of the front-passenger seat). The content on the repositionable display 102 is adapted, in accordance with the position of the repositionable display, to provide distraction-free driving safety to the driver and premium display entertainment for the passenger of the front-passenger seat.

Figure 2:
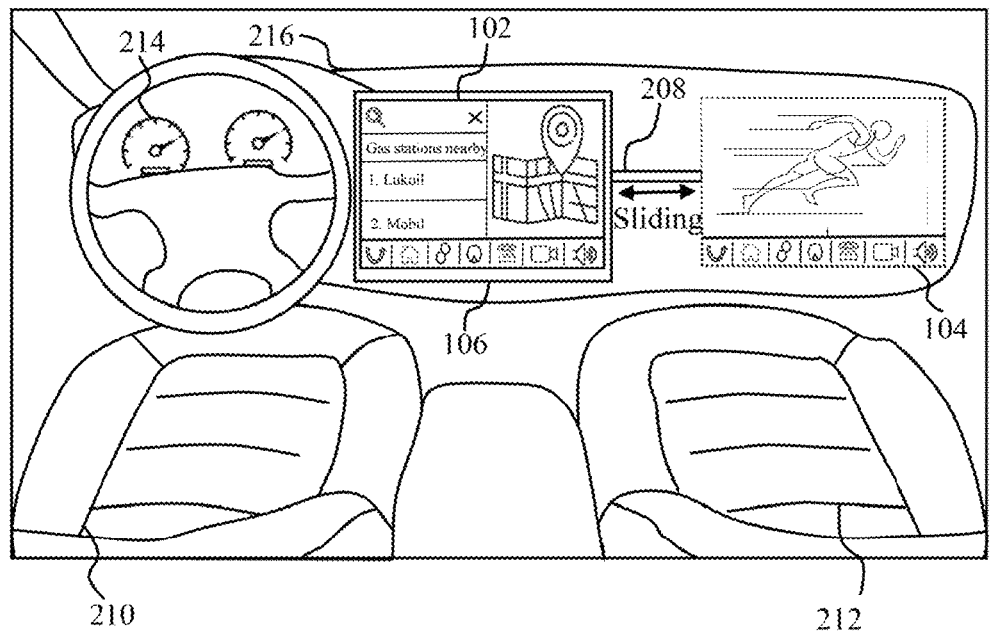
FIG. 2 is an exemplary view of an interior of a vehicle that includes a vehicle infotainment system in accordance with an implementation of the disclosure.

FIG. 2 is an exemplary view of a vehicle that includes a vehicle infotainment system in accordance with an implementation of the disclosure. The vehicle shown is a left hand drive (LHD) vehicle, but clearly the vehicle infotainment system in accordance with implementations of the disclosure is equally applicable to right hand drive (RHD) vehicles as well as to LHD vehicles. The vehicle infotainment system includes a repositionable display 102, a sensing arrangement and a controller. The vehicle here includes a driver's seat 210, a front-passenger seat 212, a dashboard 216, and a dedicated Instrument Cluster, IC, display 214. The IC display 214 may be placed, in front of the driver's seat 210, on the dashboard 216 of the vehicle, for showing vehicle and driving-related information (e.g. a speed of the vehicle, engine rpm, a fuel level, a temperature level, etc.). The IC display 214 may be fixed on the dashboard 216 and the IC display 214 is not movable. Optionally, the repositionable display 102 is recessed into the dashboard 216 of the vehicle. The repositionable display 102 may be attached in a second position 106 (i.e. a centre console). The repositionable display 102 is slidable to a first position which is optionally directly in front of the front-passenger seat 212. The repositionable display 102 may be mounted to a track 208 (e.g. a sliding track) which defines a defined path along the track 208, the repositionable display 102 may be translated or moved between the first position 104 and the second position 106. Optionally, the second position 106 coincides with a centre line of the vehicle, and the first position 104 is in front of the front-passenger seat 212 of the vehicle. The first position 104 may be adjacent to a passenger airbag for the passenger of the front-passenger seat 212. The passenger airbag may be directly in front of the front passenger seat, and the first position may be offset from the position of the front passenger airbag, towards the vehicle centre line. The track 208 supports the movement of the repositionable display 102, and may be placed behind the repositionable display 102. The repositionable display 102 may be shifted/slide along the track 208 between the second position 106 (e.g. the centre console) and the first position 104 (e.g. directly in front of the front-passenger seat 212) in the vehicle. The sensing arrangement may be placed on backside of the repositionable display 102. The sensing arrangement detects the position of the repositionable display 102. The sensing arrangement may generate electric signals indicating a current position of the repositionable display 102 and communicate the electric signals to the controller, to adapt a display mode and a content according to the repositionable display's 102 position (i.e. the first position 104 or the second position 106). The controller controls provision of content to the repositionable display 102. The controller being operatively connected to the repositionable display 102 and to the sensing arrangement. The controller is configured to control the content provided to the repositionable display 102 in dependence on signals received from the sensing arrangement.

Optionally, the repositionable display 102 is used by the driver and the passenger of the front passenger seat 212 at the second position 106. If the repositionable display 102 is accessed by the driver at the second position 106, distraction-free content and simple input operations are displayed or allowed to the driver on the repositionable display 102, thereby avoiding safety risks of the driver being distracted from monitoring the road situation. For example, the controller prohibits operations to the driver such as displaying a large chunk of texts (e.g. e-books or user agreement texts), allowing to type in long texts (e.g. a destination address or in chat window above a certain driving speed threshold), displaying for certain applications (e.g. video or games which need a relatively high concentration of the driver), etc. The vehicle infotainment system is intuitive and may allow only simple interactions on the repositionable display 102, which do not need much concentration and distraction from the driver (e.g. navigating the route, playing music, or showing the vehicle status).

Optionally, the repositionable display 102 is accessed only by the passenger of the front-passenger seat 212 at the first position 104, due to the distance of the repositionable display 102 from the driver (i.e. due to its inaccessibility to the driver). The repositionable display 102 may be exclusively used by the passenger of the front-passenger seat 212 without any distraction risk even at a high driving speed. The repositionable display 102 is optionally configured to display all kinds of information or human-machine interactivities including gaming, video watching, or remote working when the repositionable display 102 is in the first position 104. Optionally, when the repositionable display 102 is in the first position 104, important driving-related information (e.g. a vehicle status or navigation may be completely or partially migrated) to other display devices (e.g. an Instrument Cluster (IC) display or a Head-Up display (HUD)). In the first position 104 the repositionable display 102 may be angled towards the front passenger seat passenger and away from the driver, thereby further reducing the risk that the driver will be distracted by content displayed on the repositionable display 102 in the first position 104.

Figure 3A:
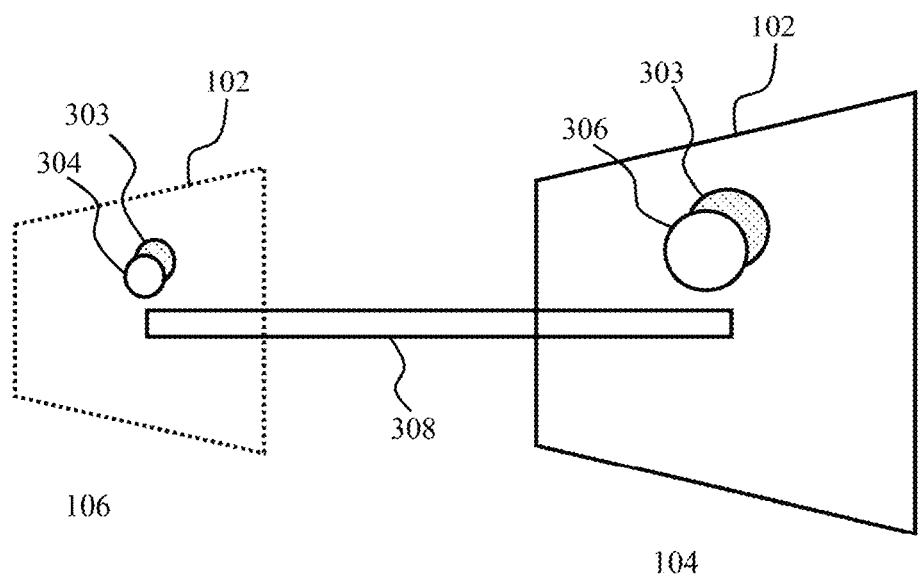
FIGS. 3A and 3B are exemplary views of sensing arrangements that detect a position of a repositionable display in accordance with implementations of the disclosure.
Figure 3B:
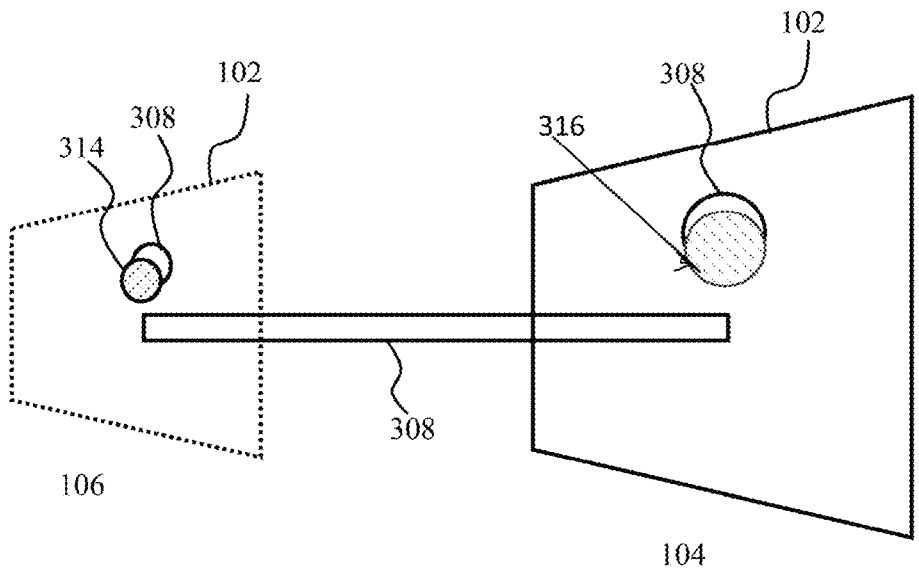

FIGS. 3A and 3B are exemplary views of sensing arrangements that detect the position of a repositionable display 102 in accordance with an implementation of the disclosure. Optionally, the sensing arrangement includes a combination of at least one magnet 303 and at least one Hall effect sensor 306. The at least one magnet 303 and the at least one Hall effect sensor 306 may be placed either on the repositionable display 102, for example on backside of the display, or on a dashboard of a vehicle to detect a position (e.g. a first position or a second position) of the repositionable display 102. Optionally, a track 308 (e.g. a track along which the display can be slid) supports movement of the repositionable display 102. The track 308 may be placed behind the repositionable display 102, and, along the track 308, the repositionable display 102 may be shifted or translated between the second position (e.g. a centre console) and the first position (e.g. a position directly in front of the front-passenger seat) in the vehicle.

FIG. 3A shows in solid line the repositionable display 102 at the first position 104, and in phantom at the second position 106. The repositionable display 102 is provided with least one magnet 303 which co-operates with at least one Hall effect sensor 304, 306 placed respectively at each of the first 104 and second 106 positions. The Hall effect sensors 304 and 306 are each connected to a processor of the infotainment system, so that the processor can determine the location of the repositionable display 102. The Hall effect sensors 304 and 306, and the magnet 303 are so located that, when the repositionable display 102 is in each of the first and second positions, the respective Hall effect sensor is exposed to the magnetic field of the magnet 303. Typically, a Hall effect sensor provides an output voltage that is directly proportional to the magnetic field strength to which the sensor is exposed, and this property can be used by systems according to the disclosure to determine when the repositionable display 102 is in each of the first and second positions. If neither the Hall effect sensor 304 at the first position nor the Hall effect sensor 306 at the second position detects the presence of the magnet 303, the processor of the system can determine that the repositionable display 102 is at a position intermediate the first and second positions. Additional Hall effect sensors may be provided intermediate the first and second positions so that the system can determine more precisely the position of the repositionable display 102 between the first and second positions.

In FIG. 3B, the relative positions of the magnet(s) and Hall effect sensor(s) of FIG. 3A have been transposed. The repositionable display 102 is provided with at least one Hall effect sensor 308, at least one magnet 314, 316, is provided at one or both of the first and second positions. A magnet may be provided at just one of the first or second positions, but this means that the Hall effect sensor on the display can then only signal the presence of a magnet at that one position, and the absence of a magnet-driven signal from the Hall effect sensor merely confirms that the display is not at that one position. It will be appreciated that with such an arrangement it is preferable to provide the magnet at the first (front passenger seat) position, so that the system controller is able to control the system so that content that might potentially distract the driver is only provided to the display when the display is in the first position. The Hall effect senor (s) 308 coupled to the repositionable display 102 detects the presence of the magnet(s) 314, 316 at the first and second positions. If the magnet 314 at the first position provides a markedly different magnetic field strength from that provided by the magnet 316 at the second position, the Hall effect sensor 308 coupled to the repositionable display 102 will provide different output voltages according to the location of the repositionable display 102. With such an arrangement, it is preferable to provide the stronger magnet at the first (passenger seat) position, rather than at the second (driver's viewing position) so that if the Hall effect sensor detects a magnetic field at reduced strength as it approaches the stronger magnet this does not lead to the processor/controller receiving a signal from the Hall effect sensor that is confusable with the signal that would be provided by the Hall effect sensor when the display is at the second position. Alternatively, the repositionable display may be provided with two (or more) Hall effect sensors at different locations, and a respective magnet provided at each of the first 104 and second 106 positions to stimulate a different one of the Hall sensors depending upon the presence of the repositionable display 102 at either the first 104 or second 106 positions. It will be appreciated that the arrangement shown in FIG. 3A, where a Hall effect sensor is provided at each of the first and second positions, with one or more magnets provided in the moveable display assembly, is preferable to the arrangement, shown schematically in FIG. 3B, where a Hall effect sensor is provided in the moveable display assembly to detect the presence of one or more magnets fixed at one or both of the first and second positions.

It will be appreciated that many other sensing arrangements can be provided to detect the position of the repositionable display 102. For example, each of the first and second positions can be provided with a switch, such as a microswitch, that is activated by the presence of the repositionable display 102. As another alternative, the previously described Hall effect sensors could be replaced by reed relays. Alternatively, an optical sensing arrangement could be provided at each of the first and second positions, with an optical source provided on or in association with the repositionable display 102. Such an optical source would preferably be subject to some characteristic modulation, a controller of the system responding to detection of the characteristic modulation by the optical sensing arrangement at either the first or the second position. In this way, the controller of the system can determine the location of the repositionable display as being the first or the second position, or intermediate the first and second positions.

The repositionable display 102 may be connected to the controller 110 (or 620 and the like) by an "umbilical" cord that carries electrical/optical signals between the controller and the display, or the repositionable display 102 may be connected to the controller using a radio connection, such as a near field communication protocol, or some arrangement of sliding electrical contacts can be provided, or some combination of these.

Figure 4:
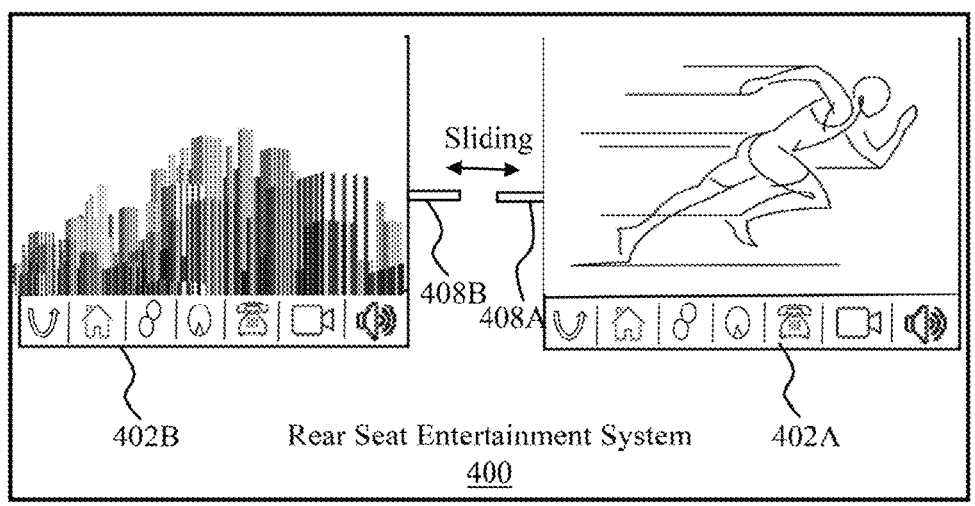
FIG. 4 illustrates an exemplary view of a vehicle infotainment system that includes a pair of displays that is separated for the use of passengers positioned in passenger seats to the rear of a driver's seat of a vehicle in accordance with an implementation of the disclosure.

FIG. 4 illustrates an exemplary view of a vehicle infotainment system 400, specifically a rear seat entertainment (RSE) system, that includes a pair of displays (402A and 402B) for the use of passengers positioned in passenger seats to the rear of a driver's seat of a vehicle in accordance with an implementation of the disclosure. The vehicle may include a rear left passenger seat 404, and a rear right passenger seat 406. The vehicle may include a rear middle passenger seat 410. This arrangement provides a vehicle infotainment system comprising: a repositionable display attached to a vehicle and slidable along a defined path between a first position and a second position within the vehicle; a sensing arrangement to detect a position of the display; a controller to control provision of content to the display, the controller being operatively connected to the display and to the sensing arrangement; the controller being configured to control the content provided to the display in dependence on signals received from the sensing arrangement; wherein the display is one of a pair of displays (402A and 402B) for the use of passengers positioned in passenger seats (404, 406, 410) to the rear of a driver's seat of the vehicle, and in the first position the pair of displays (402A and 402B) are separated, while in the second position the pair of displays (402A and 402B) are adjacent.

Optionally, each display of the pair of displays (402A and 402B) is mounted to a respective seat ahead of the passenger seats. Each display of the pair of displays (402A and 402B) may be mounted to the respective seat by means of a track (408A and 408B) along which the respective display can be translated between the first position and second position. The track (408A and 408B) (e.g. tracks to support the sliding of the respective display) may support movement of the pair of displays (402A and 402B) that are translated between the second position and the first position in the vehicle. Optionally, each display of the pair of displays (402A and 402B) is coupled to a mount that is supported from above, for example depending from the roof of the vehicle. Each display of the pair of displays (402A and 402B) may be coupled to a mount that is supported from below, for example coupled to the floor of the vehicle. Each display of the pair of displays (402A and 402B) may be mounted so as to permit other movement functions (e.g. rotating about one or more axes). Optionally, each display of the pair of displays (402A and 402B) is rotatable about a respective axis between portrait and landscape orientations.

Figure 5:
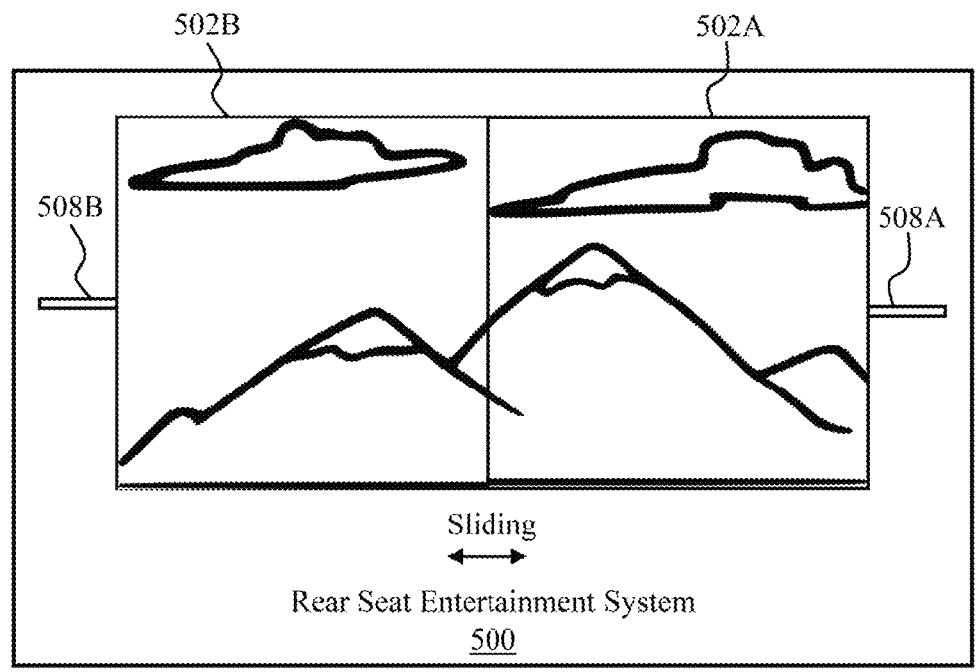
FIG. 5 illustrates an exemplary view of a vehicle infotainment system that includes a pair of displays configurable as a single display for the use of passengers positioned in passenger seats to the rear of a driver's seat of a vehicle in accordance with an implementation of the disclosure.

FIG. 5 illustrates an exemplary view of a vehicle infotainment system 500, specifically a rear seat entertainment (RSE) system, that includes a pair of displays (502A and 502B) as a single display for the use of passengers positioned in passenger seats to the rear of a driver's seat of a vehicle in accordance with an implementation of the disclosure. The vehicle may include a rear left passenger seat 404, and a rear right passenger seat 406. The vehicle may include a rear middle passenger seat 410. At least one of the pair of displays (502A and 502B) for the use of passengers positioned in passenger seats (e.g. the rear left passenger seat 504, the rear right passenger seat 506) to the rear of a driver's seat of the vehicle is a repositionable display, although more preferably each of the displays of the pair is repositionable. When the pair of displays (402A and 402B) is in the second position, the pair of displays (502A and 502B) are adjacent and may act as the single display (i.e. a combined display).

Optionally, each display of the pair of displays (502A and 502B) is mounted to a respective seat ahead of the passenger seats. Each display of the pair of displays (502A and 502B) may be mounted to the respective seat by means of a track (508A and 508B) along which the respective display can be translated between the first position and second position. Optionally, the track (508A and 508B) (e.g. sliding track) supports movement of the pair of displays (502A and 502B) that are translated between the second position and the first position in the vehicle. Each display of the pair of displays (502A and 502B) may be accompanied by other movement functions (e.g. rotating the pair of displays (502A and 502B) first and then combining them together), to obtain an optimized aspect ratio in a single display mode. Optionally, in the single display mode, the pair of displays (502A and 502B), at the second position, is usable by all passengers positioned in passenger seats (e.g. the rear left passenger seat 504, the rear right passenger seat 506, and the rear middle passenger seat 510) to the rear of the driver's seat of the vehicle.

Optionally, each of the displays (502A and 502B) is mounted in a housing. The housings have complementary formations that are engageable to couple the housings together when the displays (502A and 502B) are in the second position. Alternatively, the housings may have complementary magnets to couple the housings together when the displays (502A and 502B) are in the second position. Optionally, when the repositionable display(s) is/are in the second position, the controller is configured to adapt a display mode of the content provided to the pair of displays (502A and 502B). When the repositionable display(s) is/are in the second position, the controller is configured to treat the pair of displays (502A and 502B) as the single display. In the second position, each of the pair of displays (502A and 502B) may be in the portrait orientation.

Optionally, the rear seat display arrangement may also have wired connections to the controller 110, 620, or 1004, but preferably, if the rear seat display arrangement is provided with a connection to the controller 110, 620, or 1004, the connection uses a wireless interconnection technology such as a WiFi or Bluetooth. More commonly, the rear seat display arrangement is provided with its own dedicated computer/controller, and only optionally is there any interconnection with the controller of the front seat infotainment computer/controller.

Figure 6:
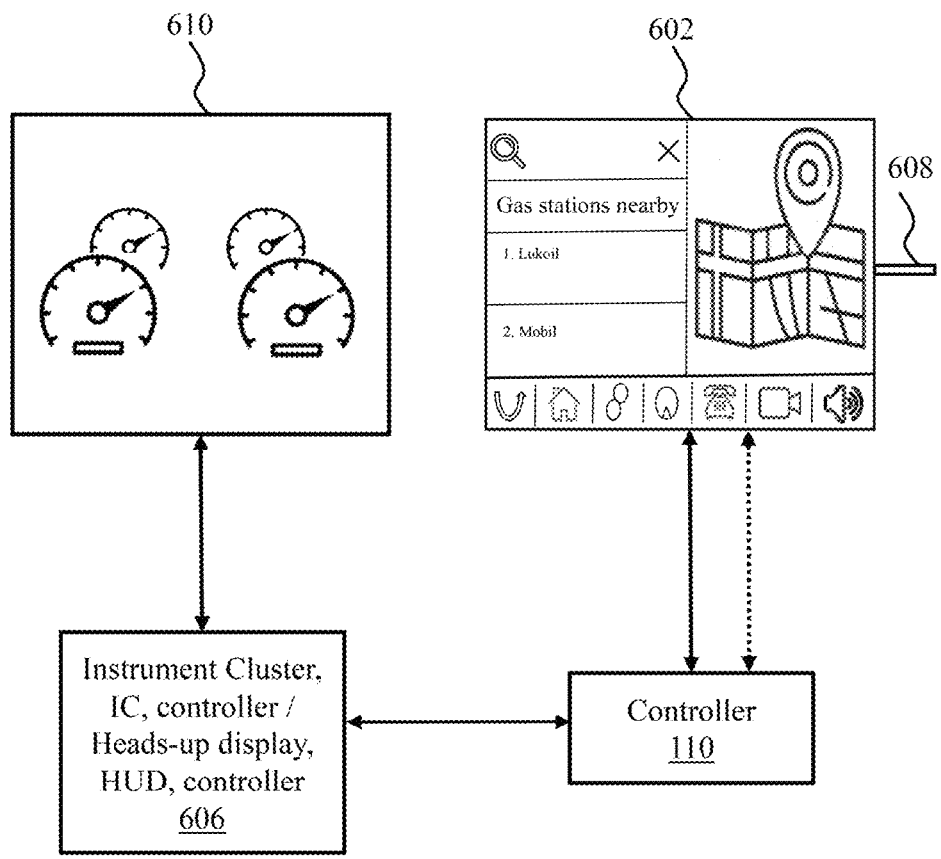
FIG. 6 illustrates an exemplary view of a vehicle infotainment system showing the repositionable display in the second position (e.g. a centre console) in accordance with an implementation of the disclosure.

FIG. 6 illustrates an exemplary view of a vehicle infotainment system that shows a repositionable display 602 in a second position (i.e. a centre console) in accordance with an implementation of the disclosure. The vehicle infotainment system includes the repositionable display 602, a sensing arrangement, and a controller 110. The vehicle infotainment system may include an Instrument Cluster (IC) controller or Head-Up display (HUD) controller 606, a track 608, and a head-up display or an instrument cluster, IC, display 610. The controller 110 may be configured to: supply at least some driving-related information to the repositionable display 602 while the repositionable display 602 is in the second position; supply the driving related information to a head up display or instrument cluster display when the repositionable display is in the first position.

Optionally, the repositionable display 602 is touch sensitive for the receipt of user (e.g. a driver's) control inputs. The controller 110 is optionally configured to process only a second set of touch inputs while the repositionable display 602 is in the second position, the second set of touch inputs being a subset of the first set of touch inputs.

Optionally, when the repositionable display 602 is in the second position, the repositionable display 602 acts as a main display and shows the driving-related information (e.g. navigation or a vehicle status). Optionally, when the repositionable display 602 is in the second position, the repositionable display 602 displays an entertainment content or allows human-machine interactivity upon a request from the driver, subject to safety constraints (e.g. below a threshold vehicle speed, or only while the vehicle is stationary, or only while a handbrake of the vehicle is engaged).

Figure 7:
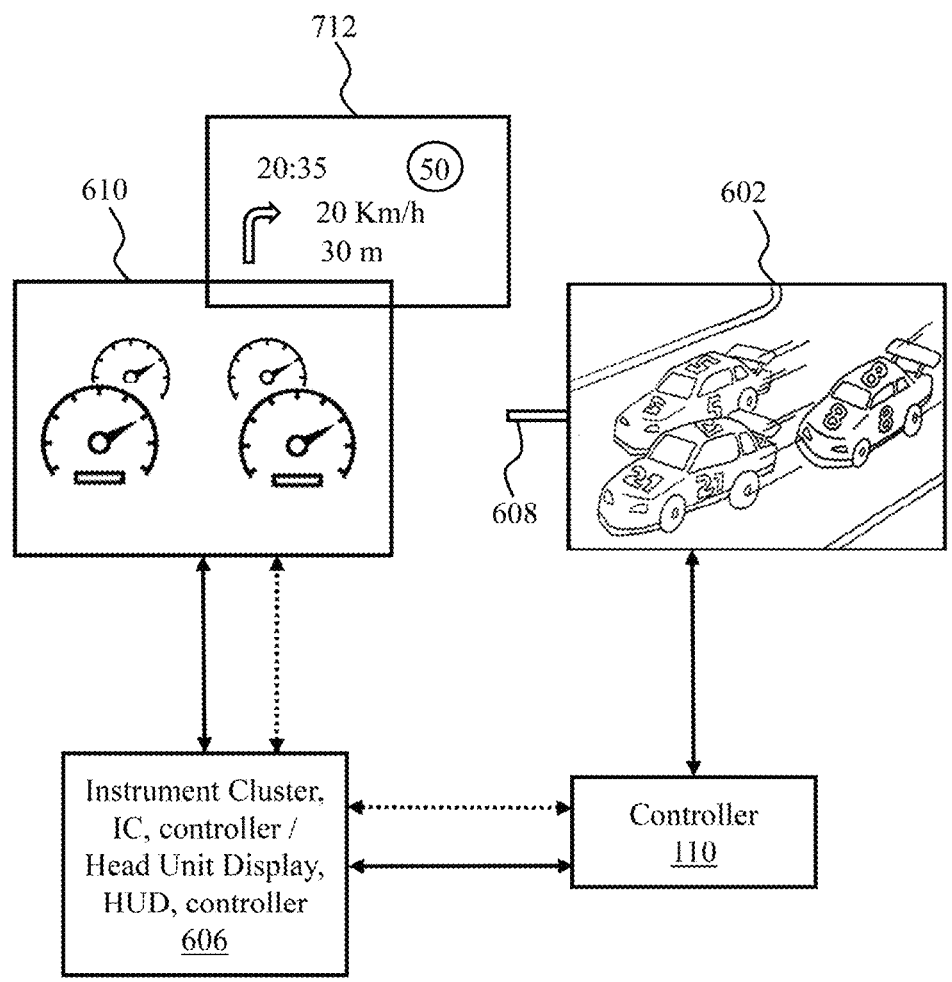
FIG. 7 illustrates an exemplary view of a vehicle infotainment system showing the repositionable display in the first position (e.g. a position directly in front of a front-passenger seat) in accordance with an implementation of the disclosure.

FIG. 7 illustrates an exemplary view of a vehicle infotainment system that shows a repositionable display 602 in a first position (i.e. a position directly in front of a front-passenger seat) in accordance with an implementation of the disclosure. The vehicle infotainment system includes the repositionable display 602, a sensing arrangement, a controller 110, and a track 608. The vehicle infotainment system may include an Instrument Cluster (IC) controller or Head-Up display (HUD), controller 606, a head-up display 712, and an instrument cluster, IC, display 610. The controller 110 may be configured to supply content selected from a first set of content to the repositionable display 602 when the repositionable display 602 is in the first position. The first set of content optionally includes contents related to music, games, videos, etc. The controller 110 may be configured to supply the driving-related information to the head-up display 712 or the instrument cluster (IC) display 610 when the repositionable display 602 is in the first position.

Optionally, the repositionable display 602 is touch sensitive for the receipt of user (e.g. a passenger of a front-passenger seat) control inputs. The controller 110 is optionally configured to process a first set of touch inputs while the repositionable display 602 is in the first position. The controller 110 may be restricted to process only the first set of touch inputs while the vehicle is in motion.

Optionally, when the repositionable display 602 is in the first position (when the repositionable display 602 is shifted to in front of a front-passenger seat), the repositionable display 602 provides exclusive usage to a passenger of the front-passenger seat. The controller 110 optionally communicates the driving-related information (e.g. navigation or a vehicle status) to the Instrument Cluster, IC, controller or Head-Up display, HUD, controller 606. The Instrument Cluster, IC, controller or Head-Up display, HUD, controller 606 may provide the aforementioned driving-related information on the head-up display 712 or a HUD optical projection, and their respective interactive operations may accordingly shift to the head-up display 712 or the HUD optical projection. The controller 110 provides more complex display contents or operations (e.g. gaming or videos) to the passenger of the front-passenger seat when the repositionable display 602 is in the first position.

Figure 8:
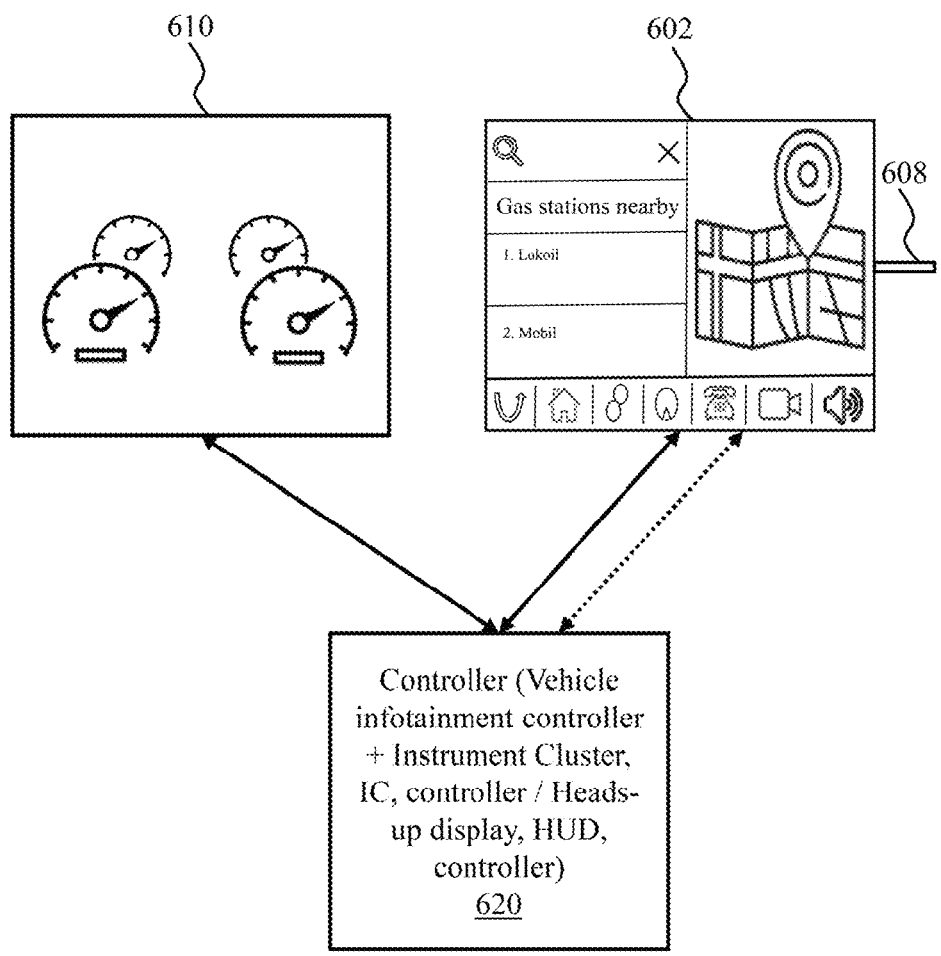
FIG. 8 illustrates an exemplary view of a vehicle infotainment system that includes a single controller that controls both the repositionable display and an instrumental cluster (IC) display in accordance with an implementation of the disclosure.

FIG. 8 illustrates an exemplary view of a vehicle infotainment system that includes a controller 620 that controls a repositionable display 602 shown in a second position (e.g. a centre console position) and an instrumental cluster, IC, display 610 in accordance with an implementation of the disclosure. The vehicle infotainment system includes the repositionable display 602, a sensing arrangement, a controller 620, a track 608, and the Instrument Cluster, IC, display 610. Optionally, when the repositionable display 602 is in the second position, the repositionable display 602 acts as a main display and shows driving-related information (e.g. navigation or a vehicle status). Optionally, when the repositionable display 602 is in the second position, the repositionable display 602 displays entertainment content or allows human-machine interactivity upon request, subject to safety constraints (e.g. below a threshold vehicle speed). A common controller 620 may include the functionalities of an Instrument Cluster, IC, controller a Head-Up display, HUD, controller, and a vehicle infotainment controller. Optionally, the controller 620 supports multiple displays of the vehicle infotainment system. The controller 620 may control the repositionable display 602, the IC display 610, or a Head-Up display for providing the driving-related information, display, and interaction.

Figure 9:
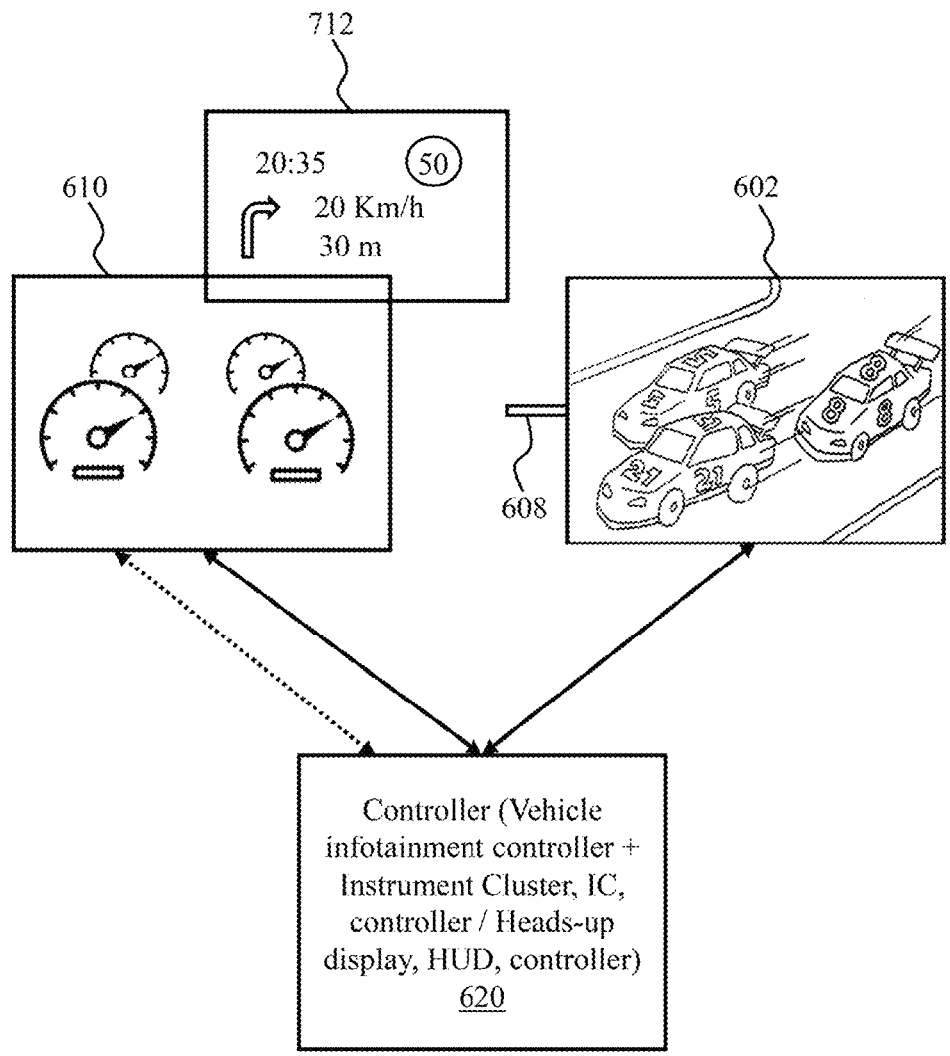
FIG. 9 illustrates an exemplary view of a vehicle infotainment system that includes a single controller that controls each of the repositionable display, an instrumental cluster, display, ad a head up display, in accordance with an implementation of the disclosure.

FIG. 9 illustrates an exemplary view of a vehicle infotainment system that includes a controller 620 that controls a repositionable display 602 that is in a first position (i.e. a position right in front of a front-passenger seat) and an instrumental cluster, IC, display 610 in accordance with an implementation of the disclosure. The vehicle infotainment system includes the repositionable display 602, a sensing arrangement, a controller 620, a track 608 and the Instrument Cluster, IC, display 610. Optionally, when the repositionable display 602 is in the first position, the controller 620 is configured to supply content selected from a first set of content to the repositionable display 602. The first set of content optionally includes contents related to music, games, videos, etc. The controller 620 may include an Instrument Cluster, IC, controller or a Head-Up display, HUD, controller, and a vehicle infotainment controller. The controller 620 may be configured to supply the driving-related information to the Instrument Cluster, IC, controller or the Head-Up display, HUD, controller, which in turn shows the driving-related information on the head-up display 610 or the instrument cluster, IC, display 610, when the repositionable display 602 is in the first position. Optionally, the controller 620 supports multiple displays of the vehicle infotainment system. The controller 620 controls the repositionable display 602, the IC display 610, the Head-Up display 712, or a HUD optical projection. Thus, the display and the operations on the repositionable display 602 may riskless due to the exclusive use of the passenger of the front-passenger seat when the repositionable display 602 is in the first position. Optionally, the controller 620 enables more complex display contents or the operations (e.g. gaming or videos) on the repositionable display 602 which is used by the passenger of the front-passenger seat.

Figure 10:
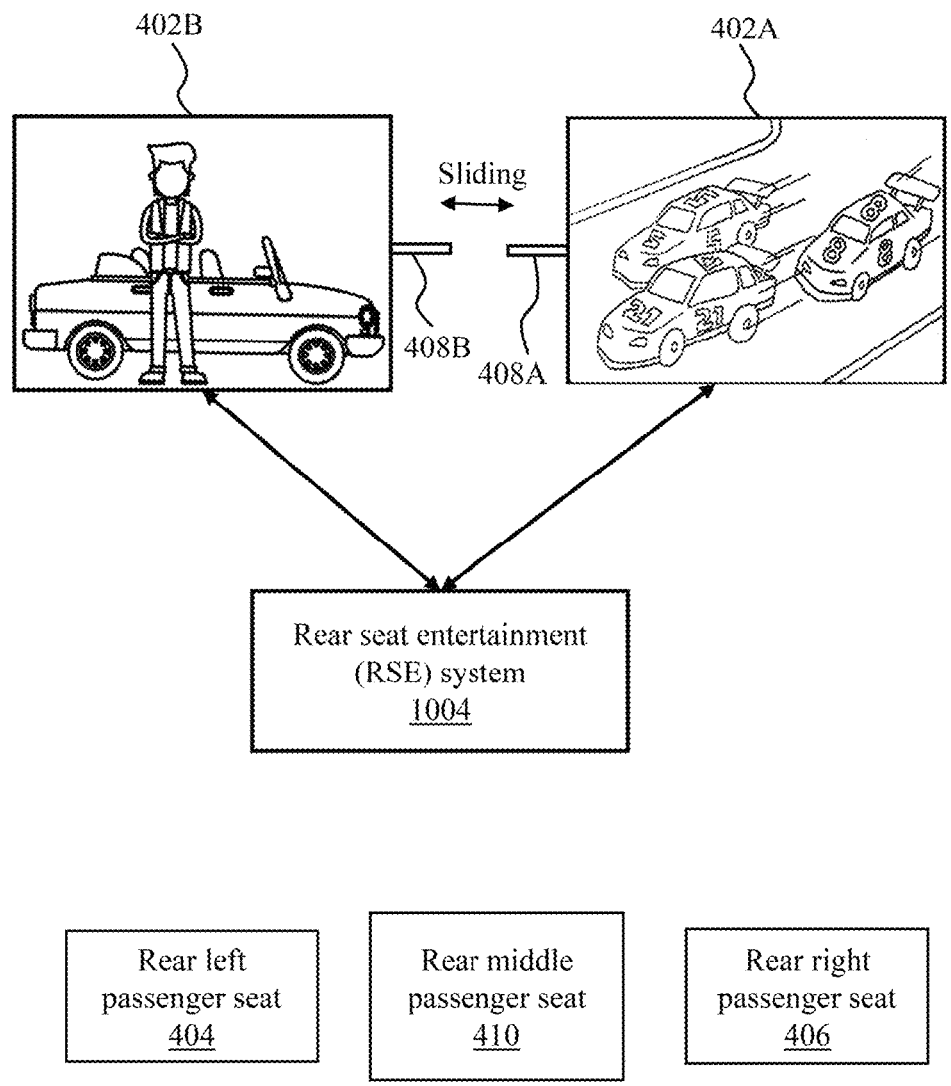
FIG. 10 illustrates an exemplary rear seat entertainment (RSE) system that controls a pair of displays that are separated for the use of passengers positioned in passenger seats to the rear of a driver's seat of a vehicle in accordance with an implementation of the disclosure.

FIG. 10 illustrates an exemplary view of a rear seat entertainment, RSE, system 1004 that controls a pair of displays (402A and 402B) that is separated for the use of passengers positioned in passenger seats to the rear of a driver's seat of a vehicle in accordance with an implementation of the disclosure. The vehicle may include a rear left passenger seat 404, and a rear right passenger seat 406. The vehicle may include a rear middle passenger seat 410. Optionally, in the RSE system 1004, the pair of displays (402A and 402B) may be either slide away from each other for two individual passenger operations positioned in passenger seats to the rear of a driver's seat of the vehicle. The RSE system 1004 drives the display ports and audio channels in a discrete way.

Figure 11:
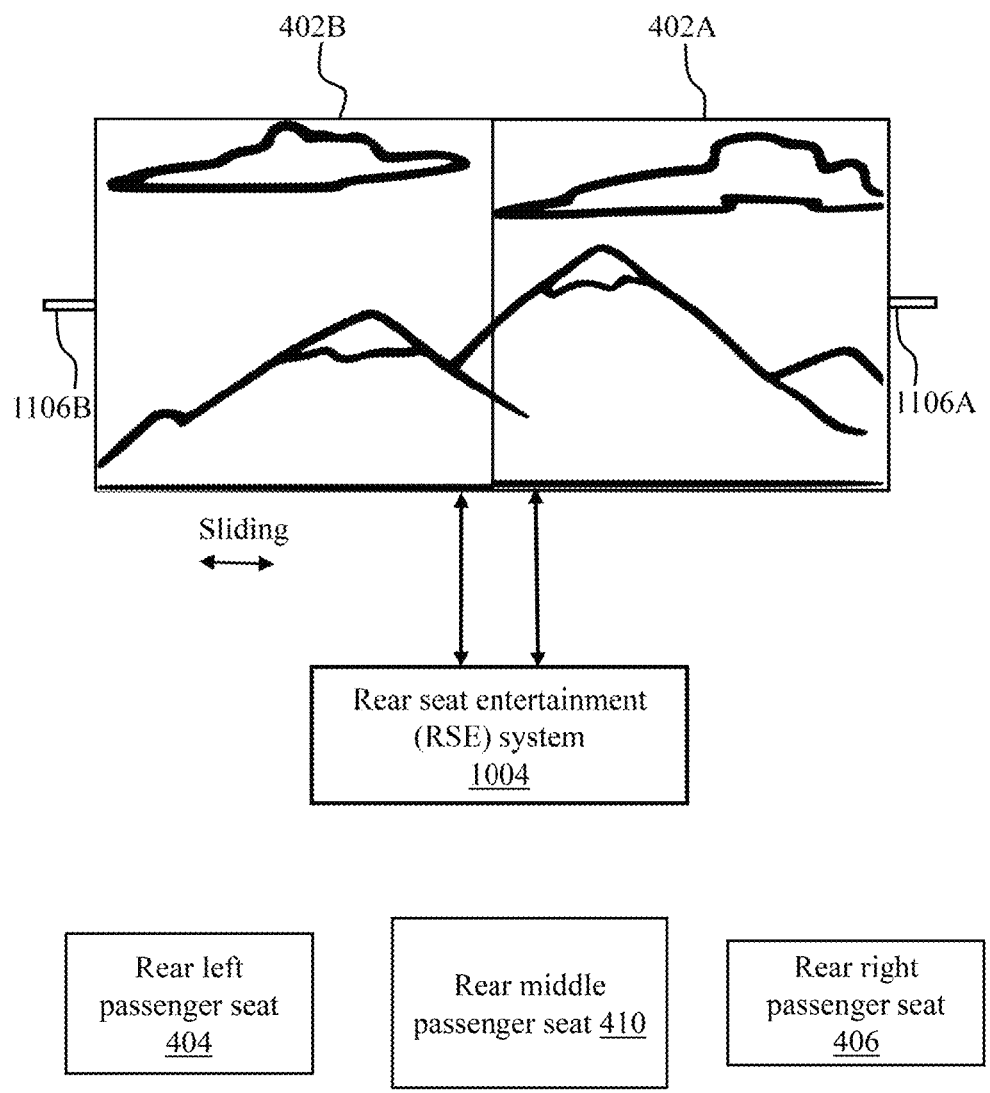
FIG. 11 illustrates an exemplary rear seat entertainment (RSE) showing a pair of displays configured as a single display, under the control of an infotainment system processor, for the use of passengers positioned in passenger seats to the rear of a driver's seat of a vehicle in accordance with an implementation of the disclosure.

FIG. 11 illustrates an exemplary view of a rear seat entertainment, RSE, system 1004 that controls a pair of displays (402A and 402B) as a single display for the use of passengers positioned in passenger seats to the rear of a driver's seat of a vehicle in accordance with an implementation of the disclosure. The vehicle may include a rear left passenger seat 404, and a rear right passenger seat 406. The vehicle may include a rear middle passenger seat 410. Optionally, in the RSE system 1004, the pair of displays (402A and 402B) may be combined together in the centre as a combined single display to show some common content for all passengers positioned in passenger seats to the rear of a driver's seat of the vehicle. The RSE system 1004 drives display ports and audio channels in a combined way.

Figure 12:
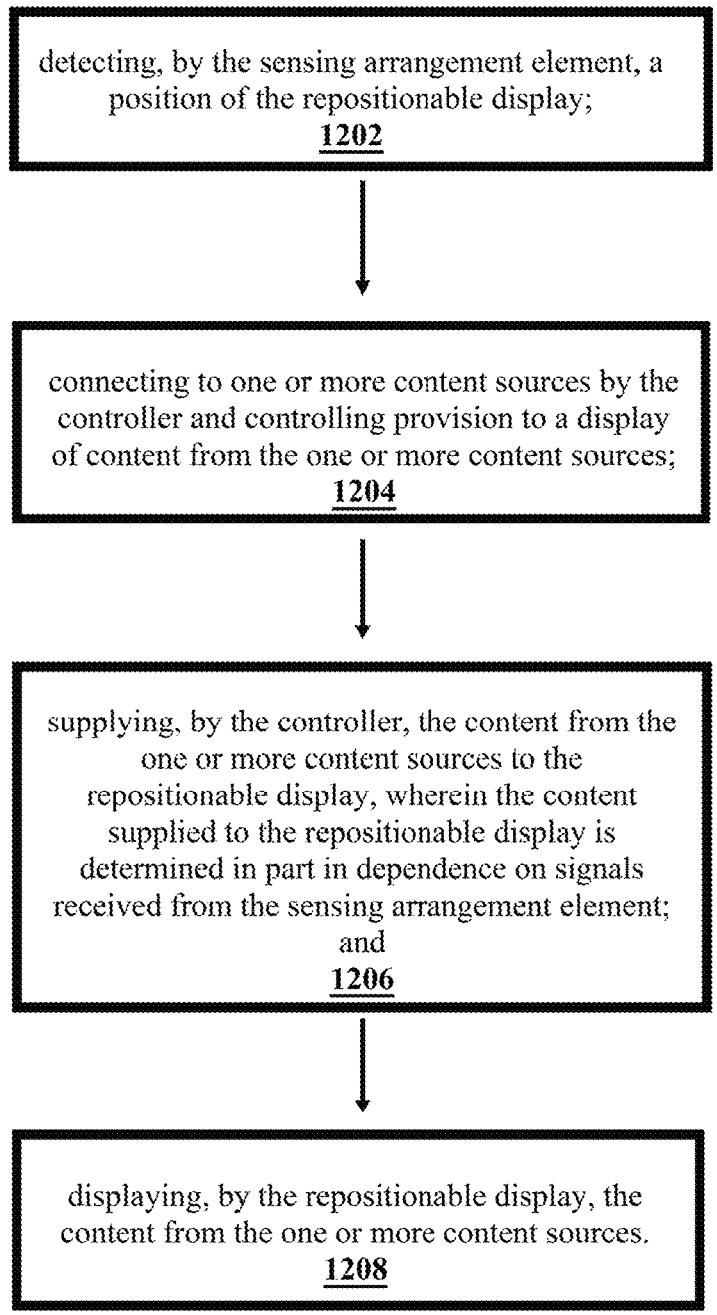
FIG. 12 is a flow diagram that illustrates a method of controlling an infotainment system of a vehicle in accordance with an implementation of the disclosure.

FIG. 12 is a flow diagram that illustrates a method of controlling an infotainment system of a vehicle in accordance with an implementation of the disclosure. The infotainment system includes a repositionable display, a sensing arrangement, and a controller. The repositionable display is attached to a vehicle and slidable along a defined path between a first position and a second position within the vehicle. The sensing arrangement detects the position of the repositionable display. The controller is operatively connected to the repositionable display and to the sensing arrangement. The controller is being configured to connect to one or more content sources and to control provision to the display of content from the one or more content sources.

At step 1202, the sensing arrangement element detects a position of the repositionable display.

At step 1204, the controller connects to one or more content sources, and controls provision to a display of content from the one or more content sources.

At step 1206, the controller is used to supply content from the one or more content sources to the repositionable display. The content supplied to the repositionable display is being determined in part in dependence on signals received from the sensing arrangement.

At step 1208, the repositionable display displays the content from the one or more content sources.

The method provides an improved user experience to a passenger of a front-passenger seat by providing the repositionable display directly in front of the passenger of the front-passenger seat. The method controls safety-critical functions of the vehicle to distinguish operations from a driver and the passenger of the front-passenger seat and prevents the display of distracting content or display operations to the driver, thereby reducing the risk of distraction based accidents while driving.

Optionally, the method further includes using the controller to: supply content selected from a first set of content to the repositionable display when the repositionable display is in the first position; and supply content selected from a second set of content to the repositionable display when the repositionable display is in the second position, the second set of content is being a subset of the first set of content.

Optionally, the method further includes using the controller to restrict the display of content on the repositionable display when the repositionable display is at neither the first position nor the second position. That is, the display may be blanked or caused to display a message to the effect that display options are inhibited while the repositionable display is at neither the first nor second positions.

Optionally, the method further includes using the controller to supply content selected from the second set of content to the repositionable display when the repositionable display is between the first position and the second position. In this way, content that is determined to be safe for the driver to view may (continue to) be displayed on the repositionable display is in between the second and first positions.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein

What is claimed is:
1. A vehicle infotainment system comprising:
    a repositionable display, attached to a vehicle and slidable along a defined path between a first position and a second position within the vehicle;
    a sensing arrangement element, configured to detect a position of the repositionable display and send signals to a controller;
    the controller, operatively connected to both the repositionable display and the sensing arrangement, configured to control provision of content provided to the repositionable display, and control the content provided to the repositionable display in dependence on the signals received from the sensing arrangement element;
    wherein the repositionable display is one of a pair of displays for the use of passengers positioned in passenger seats to the rear of a driver's seat of the vehicle, and in the first position, the pair of displays are separated, while in the second position, the pair of displays are adjacent;
    wherein each display of the pair of displays is mounted to a respective seat ahead of the passenger seats; and
    wherein each display of the pair of displays is mounted to the respective seat by a track along which the respective display is translated between the first position and the second position.
2. The vehicle infotainment system of claim 1, wherein the first position is in front of a front-passenger seat of the vehicle, and the second position is a centre console position between a driver's seat and the front-passenger seat.

3. The vehicle infotainment system of claim 1, wherein the second position coincides with a centre line of the vehicle, and the first position is in front of a front-passenger seat of the vehicle.

4. The vehicle infotainment system of claim 3, wherein the first position is adjacent to a passenger airbag for a passenger of the front-passenger seat.

5. The vehicle infotainment system of claim 3, wherein the repositionable display is recessed into a dashboard of the vehicle.

6. The vehicle infotainment system of claim 2, wherein the repositionable display is mounted to a track which defines the defined path and along which the repositionable display is translated between the first position and the second position.

7. The vehicle infotainment system of claim 1, wherein the controller is configured, in dependence on the signals received from the sensing arrangement element, to:
supply content selected from a first set of content to the repositionable display based on the repositionable display being in the first position; and
supply content selected from a second set of content to the repositionable display based on the repositionable display being in the second position.

8. The vehicle infotainment system of claim 1, wherein the controller is configured to restrict the display of content on the repositionable display based on the repositionable display being at neither the first position nor the second position.

9. The vehicle infotainment system of claim 7, wherein the controller is further configured to supply content selected from the second set of content to the repositionable display based on the repositionable display being in between the first position and the second position.

10. The vehicle infotainment system of claim 1, wherein the controller is configured to:
supply at least one piece of driving related information to the repositionable display while the repositionable display is in the second position; and
supply the at least one piece of driving related information to a head up display or an instrument cluster display based on the repositionable display being in the first position.

11. The vehicle infotainment system of claim 1, wherein the repositionable display is touch sensitive for the receipt of user control inputs, and the controller is configured to:
process a first set of touch inputs based on the repositionable display being in the first position; and
process only a second set of touch inputs based on the repositionable display being in the second position.

12. The vehicle infotainment system of claim 11, wherein the controller is restricted to process only the first set of touch inputs based on the vehicle being in motion.

13. The vehicle infotainment system of claim 1, wherein a motor drive arrangement is provided to translate the repositionable display between the first position and the second position and back.

14. The vehicle infotainment system of claim 1, wherein each of the displays is mounted in a housing, wherein housings have complementary formations that are engageable to couple the housings together in response to the displays being in the second position.

15. The vehicle infotainment system of claim 1, wherein each of the displays is mounted in a housing, wherein housings have complementary magnetic arrangements to couple the housings together in response to the displays being in the second position.

16. The vehicle infotainment system of claim 1, wherein based on the repositionable display being in the second position, the controller is configured to adapt a display mode of the content provided to the pair of displays.

17. The vehicle infotainment system of claim 16, wherein based on the repositionable display being in the second position, the controller is configured to treat the pair of displays as a single display.

18. The vehicle infotainment system of claim 1, wherein each display of the pair of displays is coupled to a mount that is supported from above.

19. The vehicle infotainment system of claim 1, wherein each display of the pair of displays is coupled to a mount that is supported from below.

20. The vehicle infotainment system of claim 1, wherein each display of the pair of displays is rotatable about a respective axis between portrait and landscape orientations.

21. The vehicle infotainment system of claim 20, wherein in the second position, each of the pair of displays is in the portrait orientation.

22. The vehicle infotainment system of claim 1, wherein the sensing arrangement element includes a combination of at least one magnet and at least one Hall effect sensor.

23. A method of controlling an infotainment system of a vehicle, wherein the infotainment system includes a repositionable display, a sensing arrangement element, and a controller, the repositionable display is attached to a vehicle and slidable along a defined path between a first position and a second position within the vehicle, and the controller operatively connected to both the repositionable display and the sensing arrangement element, wherein the method comprises:
detecting, by the sensing arrangement element, a position of the repositionable display;
connecting to one or more content sources by the controller and controlling provision to a display of content from the one or more content sources;
supplying, by the controller, the content from the one or more content sources to the repositionable display, wherein the content supplied to the repositionable display is determined in part in dependence on signals received from the sensing arrangement element;
displaying, by the repositionable display, the content from the one or more content sources;
wherein the repositionable display is one of a pair of displays for the use of passengers positioned in passenger seats to the rear of a driver's seat of the vehicle, and in the first position, the pair of displays are separated, while in the second position, the pair of displays are adjacent;
wherein each display of the pair of displays is mounted to a respective seat ahead of the passenger seats; and
wherein each display of the pair of displays is mounted to the respective seat by a track along which the respective display is translated between the first position and the second position.

24. The method of claim 23, further comprising:
supplying, by the controller, content selected from a first set of content to the repositionable display based on the repositionable display being in the first position; and
supplying, by the controller, content selected from a second set of content to the repositionable display based on the repositionable display being in the second position.

25. The method of claim 24, further comprising:
restricting, by the controller, the display of content on the repositionable display based on the repositionable display being at neither the first position nor the second position.

26. The method of claim 24, further comprising:
supplying, by the controller, content selected from the second set of content to the repositionable display based on the repositionable display being between the first position and the second position.

* * * * *